Dec. 26, 1950          V. N. TRAMONTINI          2,535,969
HEATER CONTROL SYSTEM WITH TIME DELAY SWITCH
Filed Sept. 14, 1946
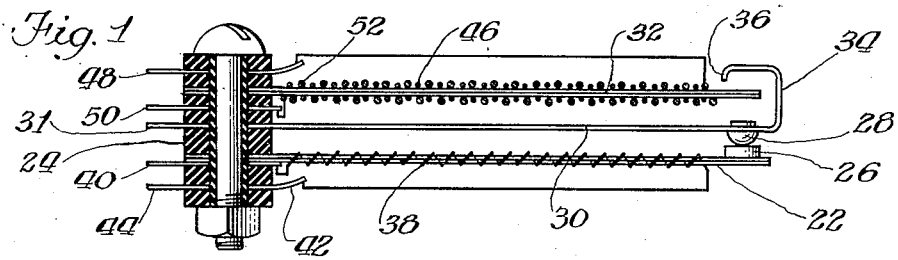
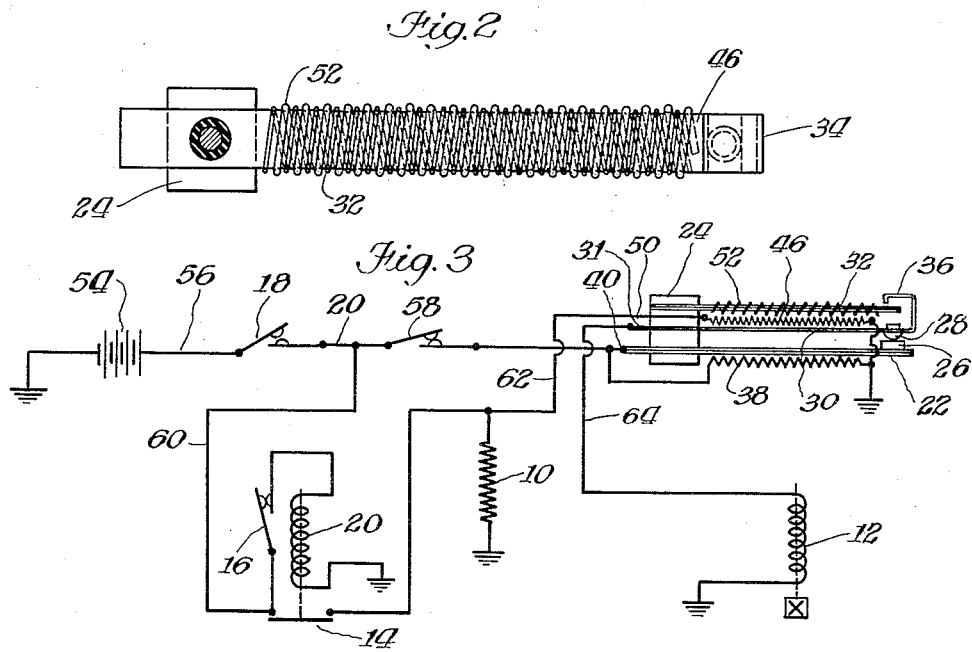
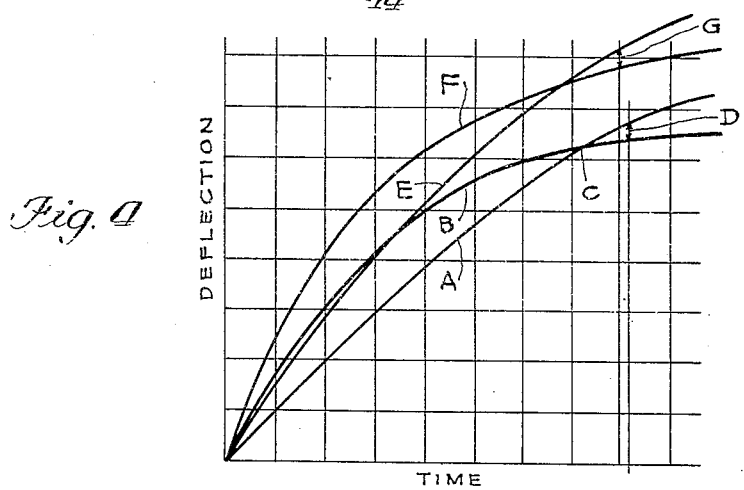
Inventor:
Vernon N. Tramontini
By:
Hinkle, Horton, Ahlberg, Hausmann & Kupper
Attorneys Patented Dec. 26, 1950

2,535,969

UNITED STATES PATENT OFFICE 2,535,969

HEATER CONTROL SYSTEM WITH TIME-DELAY SWITCH

Vernon N. Tramontini, Indianapolis, Ind., assignor to Stewart-Warner Corporation, Chicago, Ill., a corporation of Virginia Application September 14, 1946, Serial No. 697,127

2 Claims. (Cl. 158—28)

1

The present invention relates to heater control systems having time delay switches and more particularly to a switch suitable for use as a safety device to shut off the flow of fuel to a vehicle heater of the combustion type in the event that the heater fails to function.

As an example, a heater of the type disclosed in the co-pending application of George W. Allen and Vernon N. Tramontini for "Heaters," filed June 14, 1946, and which has been given Serial No. 676,776, now Patent No. 2,507,081 granted May 9, 1950, and assigned to the present assignee, has no device to shut off the flow of fuel to the heater in the event that the heater does not start properly. Under certain conditions flow of fuel to the heater is not particularly objectionable even though the heater does not start, because the quantity of fuel which collects in the heater and subsequently flows from the exhaust pipe is not very great. Under some conditions, however, it is desirable to turn off the fuel supply to the heater rather promptly in the event that the heater does not start.

In the past time delay switches have been proposed for this purpose. They usually depend upon the rate of heating of a bimetal strip by an electric resistance element to determine the interval from the time the heater is turned on until the fuel supply is automatically turned off in the event that the heater does not start meanwhile. The difficulty with such schemes when applied to automobile or other vehicle heaters is that the voltage at the heater may vary all the way from approximately four volts to over eight volts, and, therefore, the rate of heating of the thermosensitive element of such a time delay switch will not be even approximately constant. As an example, a high voltage source will cause the bimetal element to heat up quickly and to turn off the heater within a comparatively short time interval whereas lower voltages will require longer time for operation and under some conditions the switch may never operate at all because the heat loss from the bimetal element may balance the heat gain from the electric resistance heater before the thermosensitive element has deflected enough to operate the switch. It is, therefore, one of the objects of the present invention to provide a novel heater control system having a time delay switch of the electrically heated bimetal type which will have a substantially constant time of operation even though the voltage supplied thereto may vary throughout a wide range.

Yet another object is to provide a novel vehicle heater electrical circuit which will interrupt the flow of fuel to the heater in the event that the heater does not start within a short period, such as a matter of three minutes or so after the heater has been turned on.

Other objects and advantages will become apparent from the following description of a preferred embodiment of my invention which is illustrated in the accompanying drawings.

In the drawings:

Fig. 1 is a longitudinal vertical sectional view of a time delay switch embodying the present invention;

Fig. 2 is a top view of a switch embodying the present invention;

Fig. 3 is an electrical circuit diagram illustrating one arrangement for using the switch illustrated in Figs. 1 and 2 for controlling the operation of a heater; and Fig. 4 is a graph showing deflection of the bimetal elements plotted against time at different ambient voltages.

A heater of the type intended to be used with the switch of the present invention is described in the previously referred to copending application. For the purpose of understanding the present invention, it is sufficient to consider that such a heater is provided with an electrical igniter of the hot wire type indicated in Fig. 3 by the numeral 10 which is energized at the time of starting the heater. This igniter quickly heats to ignition temperature and normally starts combustion within the heater in a matter of ten to twenty seconds, although under some conditions ignition may be delayed for a period of an additional half minute or so, particularly if the ambient temperature is low or the voltage is low so that considerable time is required to bring the igniter to ignition temperature.

Such a heater is also provided with a magnetic valve indicated in Fig. 3 by the numeral 12 which is located in the fuel line to the heater and is normally in the closed position. When this valve is energized electrically, it opens and permits fuel to flow until it is de-energized. Thus, the flow of fuel to the heater can be controlled by energizing the valve 12.

The igniter 10 is energized by way of a relay 14 under the control of an igniter switch 16. The switch 16 is normally closed whenever the heater is cold so that as soon as a master switch 18 is closed the coil 20 of the relay 14 will be energized, thereby closing the relay 14 and energizing the igniter 10. If the heater starts promptly as it should, the increase in temperature of the ignited switch 16, which is normally located so as to be sensitive either to the temperature of the air flow from the heater or to the temperature of some portion of the metal surface of the heater, will cause this switch to interrupt the circuit to the coil 20 of the relay, thereby permitting the relay to drop open and de-energize the igniter 10.

The switch of the present invention operates in conjunction with the igniter circuit and functions to interrupt the supply of fuel to the heater in the event that the igniter circuit remains energized after a period of three minutes or so.

By referring to Fig. 1 of the drawings, it will be seen that the switch comprises a lower bimetal element 22 supported at one end in an insulating block 24 while the free end is provided with a contact 26 upon its upper side. This contact 26 is associated with a second contact 28 mounted near the outer free end of a spring metal strip 30, the opposite end of which is fixed rigidly with respect to the similar end of the bimetal strip 22 in the block 24. The end of this strip 30 forms a terminal 31. An upper bimetal strip 32 is disposed above the spring metal strip 30 and has one end fixed in the block 24 while its free end is located approximately above the contact 28. In other words, the three strips 22, 30 and 32 are generally parallel. At its extreme outer end the strip 30 has an upwardly bent portion 34 which extends to a position well above the end of the strip 32 and there is reversely bent to form a hook 36 adapted to be caught by the outer end of the bimetal strip 32 when this latter strip is bent upwardly a predetermined amount relative to the strip 30. The bimetal strips 22 and 32 may be considered as identical in characteristics in that both of the strips will flex upwardly the same amount when heated to the same temperature.

The lower bimetal strip 22 is wound with an electric resistance heating element 38, one end of which is connected to the bimetal strip 22 and to a terminal 40 which extends outwardly from the block 24. The opposite end of the heating element 38 is grounded as by a clip 42 which extends outwardly from the block 24 to form a terminal 44. The upper bimetal strip 32 is similarly wound with an electric heating element 46 having one end grounded to a terminal clip 48 while the other end is connected to a terminal 50 which extends outwardly from the block 24.

The resistance of the upper heating element 46 is somewhat lower than that of the lower element 38. As an example, in a typical switch adapted for operation at six volts, the resistance of the upper element may be 20 ohms while that for the lower strip may be 36 ohms.

In addition to the heating element 46, the upper strip 32 is also provided with a coil of comparatively heavy copper wire 52 which is wound between the turns of the heating element 46. This copper coil 52 is not connected at its ends but simply serves, as will be pointed out presently, to increase the heat capacity of the upper bimetal strip.

Inasmuch as the mass added to the upper strip to increase its heat capacity is in the form of a loose copper coil 52, it will be appreciated that this coil is quite soft and flexible and that, therefore, it will have little or no influence upon the bending movement of the strip 32.

By referring to Fig. 3 of the drawings, it will be seen that the battery, for instance, a six volt automobile battery 54, is grounded at one side while its other side is connected by a lead 56 to the previously referred to master switch 18. The opposite side of the master switch is connected by a lead 20 to a bimetal type overheat safety switch 58, the opposite side of which leads to the terminal 40 connected to one end of the heating element 38 and to the bimetal strip 22, thereby energizing the contact 36.

The lead 20 from the master switch is also connected by a branch 60 to the igniter 10 by way of a relay 14, this relay being operated by the previously referred to coil 20, one side of which is grounded, the other being connected to the branch 60 by way of the thermosensitive igniter switch 16. The igniter terminal connected to the relay 14 is also connected by a lead 62 to the terminal 50 leading to the heater element 46 associated with the bimetal strip 32, the other end of this heater element being grounded as previously described.

The contact 28 is electrically connected by way of the strip 30 and terminal 31 at the end thereof to a lead 64 connected at its opposite end to the coil of the magnetic valve 12, the opposite end of this coil being grounded. As previously mentioned, this coil is of the type which remains closed as long as it is deenergized and opens whenever electrical energy is flowing thereto.

The device operates in the following manner. Whenever the heater is cold, contacts 26 and 28 will be together and the free end of the bimetal strip 32 will be somewhat below the end of the hook 36. Also, the overheat switch 58 which is of the bimetal type will be closed as will the igniter switch 16. The overheat switch 58 is arranged as is customary so as to be sensitive to the temperature of the air flowing from the heater and is designed to open whenever this temperature exceeds some predetermined safe maximum.

Assuming that the heater switches are in the positions above described and that the heater master switch 18 is closed, it will be seen that electrical energy will flow through the switch 18 and lead 60 to the igniter switch 16. This being closed, the circuit continues through the relay coil 20 and to ground, thereby causing the relay to close and permit electrical energy to flow through the contacts 14 to the igniter 10. Energy flows by the same path and through the lead 62 to the heating element 46 which immediately starts to increase in temperature. Simultaneously, current flows by way of the overheat switch 58 to the heating element 38 and to the bimetal strip 22 and thence to the contact 26. The temperature of the heating element 38, therefore, starts to increase while current flowing from the contact 26 to the contact 28 and continuing by way of the strip 30 and lead 64 opens the fuel valve 12. Thus, immediately upon closing of the switch 18 the igniter 10 starts heating, fuel is supplied to the heater, and heating elements 38 and 46 are increasing in temperature. The bimetal strips 22 and 32, therefore, begin to flex upwardly.

Inasmuch as the resistance of the bimetal heater 46 is less than the heater 38, the upper strip 32 will be supplied with heat at a more rapid rate than will the lower strip 22. However, because the comparatively large mass of copper consisting of the coil 52 is associated with the upper bimetal strip 32, the rate of temperature rise of the upper strip will be less than will be the rate of rise of lower strip 22. For a period of time, therefore, the free end of the strip 22 will move upwardly more rapidly than will the free end of the upper strip 32. As the lower strip 22 moves upwardly the contact 26 carries the upper contact 28 and flexes the strip 30. Therefore, current continues to flow through the fuel valve 12.

If after a short interval of time the heater starts in the normal manner and the temperature rises sufficiently to open the igniter switch 16, the igniter 10 will be de-energized as will the heating element 46. Therefore, the bimetal strip 32 will return to its original position, having never made contact with the hook 36. The contacts 26 and 38, therefore, are never separated and fuel continues to flow to the heater in the normal manner.

If, on the other hand, the heater does not start for any of a number of reasons, the igniter switch 16 will remain closed, thereby continuing energization of the heating element 46. Inasmuch as the heating element 46 supplies more heat than does the lower heating element 38, it will be seen that eventually it will heat the bimetal strip 32 to a higher equilibrium temperature in spite of the presence of the mass of copper consisting of the coil 52. Therefore, although the lower strip flexes upwardly more rapidly at first, it will approach equilibrium conditions sooner so that eventually it approaches a stationary position. Soon thereafter the free end of the upper strip 32 catches beneath the hook 36 and lifts the contact 28 away from the contact 26, thereby de-energizing the fuel valve 12 so as to interrupt the flow of fuel to the heater. The contacts 26 and 28 will of course be held in the open position so long as the master switch 18 is closed.

In Fig. 4 the lowermost curve A shows the rate of upward movement of the upper bimetal strip 32 plotted against time at six volts. The second curve B is a similar plotting of the upward movement of the free end of the lower bimetal strip 22 also at six volts. From these two curves it will be seen that the rate of movement of the upper strip 32 is more nearly a straight line for a greater length of time whereas the rate of movement of the strip B is more rapid at first but approaches equilibrium more quickly. Further, it is apparent that at the point C the free ends of the two strips have moved an equal amount and that shortly thereafter, at the point D, the movement of the upper strip will have been greater than the movement of the lower strip by an amount equal to the original spacing between the free end of the upper bimetal strip 32 and the hook 36. The contacts 28 and 26 are, therefore, separated at the point D.

The upper set of curves E and F illustrates the same phenomenon as the curves A and B, respectively, excepting at eight volts rather than six volts. From a comparison of these two sets of curves it will be seen that although the deflection at the higher voltage is greater for both of the bimetal strips the relative deflection between the two is such that even at the higher voltage the free end of he bimetal strip 32 catches beneath the hook 36 and separates the contacts 26 and 28 after approximately the same time interval. This point of separation is indicated at the point G.

Since the bimetal strips 22 and 32 preferably are identical, it will be apparent that the switch is inherently compensated for ambient temperature. In other words, any increase in the ambient temperature will cause both strips to flex upwardly an equal amount so that at the starting position the spacing between the end of the hook 36 and the end of the bimetal strip 32 always is substantially constant.

Although only two sets of curves, at six and eight volts, have been shown in Fig. 4, curves for other voltages will be either higher or lower as a pair than those shown, depending upon whether the voltages are higher or lower as compared with the voltages applied in producing the curves of Fig. 4. As in the case of the two sets of curves of Fig. 4, raising or lowering the curves by applying higher or lower voltages does not appreciably shift the point at which the curves cross and then separate by an amount equal to the original spacing between the free end of the bimetal strip 32 and the hook 36. Thus, regardless of whether the rate of heating of the two strips is high because of a high applied voltage or whether the rate of heating is low because of a low applied voltage, the relative rates of movements of the two strips will be approximately the same even though the actual rates of movement of the two as a group will vary considerably depending upon the power dissipation of the heating elements at different voltages. If desired, the switch of the present invention may be enclosed within a conventional cover or casing to protect it from dirt and damage. No such cover has been shown, however, since such showing would serve no useful purpose.

It will be seen that a time delay switch of the type forming the subject matter of the present invention is admirably suited for interrupting the fuel supply to a heater in the event that the heater does not start promptly and that the time interval during which the heater is given a chance to start before the fuel is turned off will remain substantially constant even though the ambient voltage may vary considerably.

Having described my invention, what I claim as new and useful and desire to secure by Letters Patent of the United States is:

1. In a heater control system having a main electric circuit intended to be connected to a source of electric potential having widely fluctuating voltage characteristics, an igniter circuit connected to said main circuit including an igniter of the hot wire resistance type and an igniter switch for de-energizing said igniter in response to combustion, and a fuel control circuit connected to said main circuit including an electrically actuated fuel valve, a pair of contacts controlling said fuel control circuit, thermostatic means connected to tend to move one of said contacts toward the other slowly and finally to reach an equilibrium position when heated, a heater for said thermostatic means energized by said main circuit, second thermostatic means connected to tend to move the other of said contacts away from the first when heated, a second heater for said second thermostatic means energized by said igniter circuit, the last said thermostatic means and heater having characteristics such that they at first produce movement of the last said thermostat at a slower rate than the first said thermostat but ultimately cause greater movement of said last said thermostat before reaching an equilibrium position, and lost motion means connecting the last said thermostatic means to said other contact.

2. In a heater control system having a main electric circuit intended to be connected to a source of electric potential having widely fluctuating voltage characteristics, an igniter circuit connected to said main circuit including an igniter of the hot wire resistance type and an igniter switch for de-energizing said igniter in response to combustion, and a fuel control circuit connected to said main circuit including an electrically actuated fuel valve, a pair of contacts controlling said fuel control circuit, thermostatic means connected to tend to move one of said contacts toward the other slowly and finally to reach an equilibrium position when heated, a heater for said thermostatic means energized by said main circuit, second thermostatic means connected to tend to move the other of said contacts away from the first when heated, a second heater for said second thermostatic means energized by said igniter circuit, and the last said thermostatic means and heater having characteristics such that they at first produce movement of the last said thermostat at a slower rate than the first said thermostat but ultimately cause greater movement of said last said thermostat before reaching an equilibrium position.

VERNON N. TRAMONTINI.

REFERENCES CITED

The following references are of record in the file of this patent:

UNITED STATES PATENTS

| Number | Name | Date |
| --- | --- | --- |
| 2,149,871 | Rohr | Mar. 7, 1939 |
| 2,201,328 | Wallis et al. | May 21, 1940 |
| 2,217,488 | Mahnke | Oct. 8, 1940 |
| 2,272,977 | Slocum et al. | Feb. 10, 1942 |
| 2,329,119 | Jacobs | Sept. 7, 1943 |
| 2,355,309 | Lange | Aug. 8, 1944 |

FOREIGN PATENTS

| Number | Country | Date |
| --- | --- | --- |
| 811,383 | France | Jan. 14, 1937 |